J. W. BISHOP.
MACHINE FOR MAKING BATTERY JARS AND OTHER HARD RUBBER RECEPTACLES.
APPLICATION FILED AUG. 15, 1919.
1,407,979.
Patented Feb. 28, 1922.
10 SHEETS—SHEET 6.
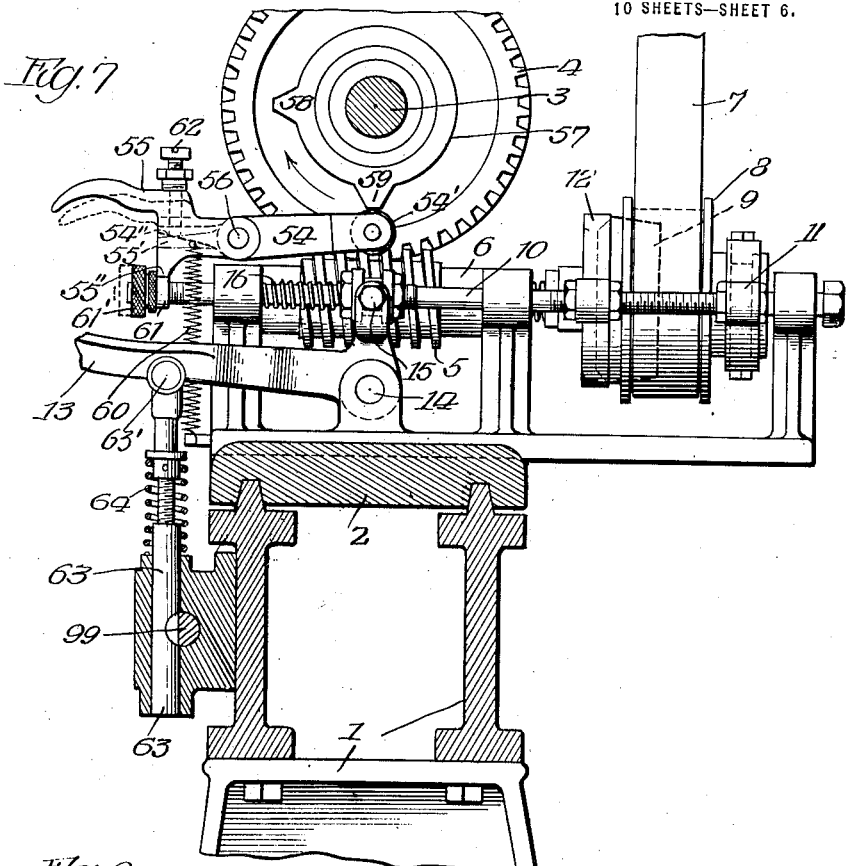
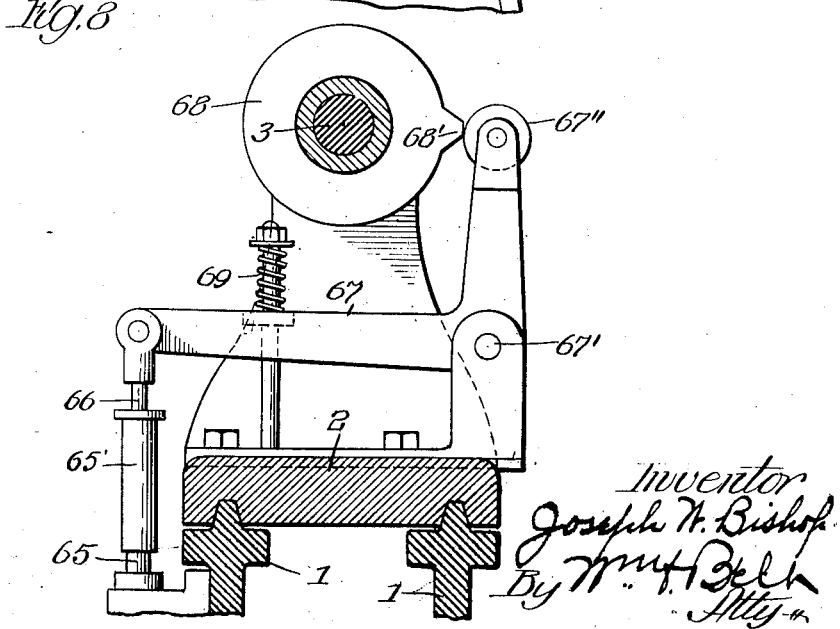
Inventor
Joseph W. Bishop
By Wm H Bell
Atty

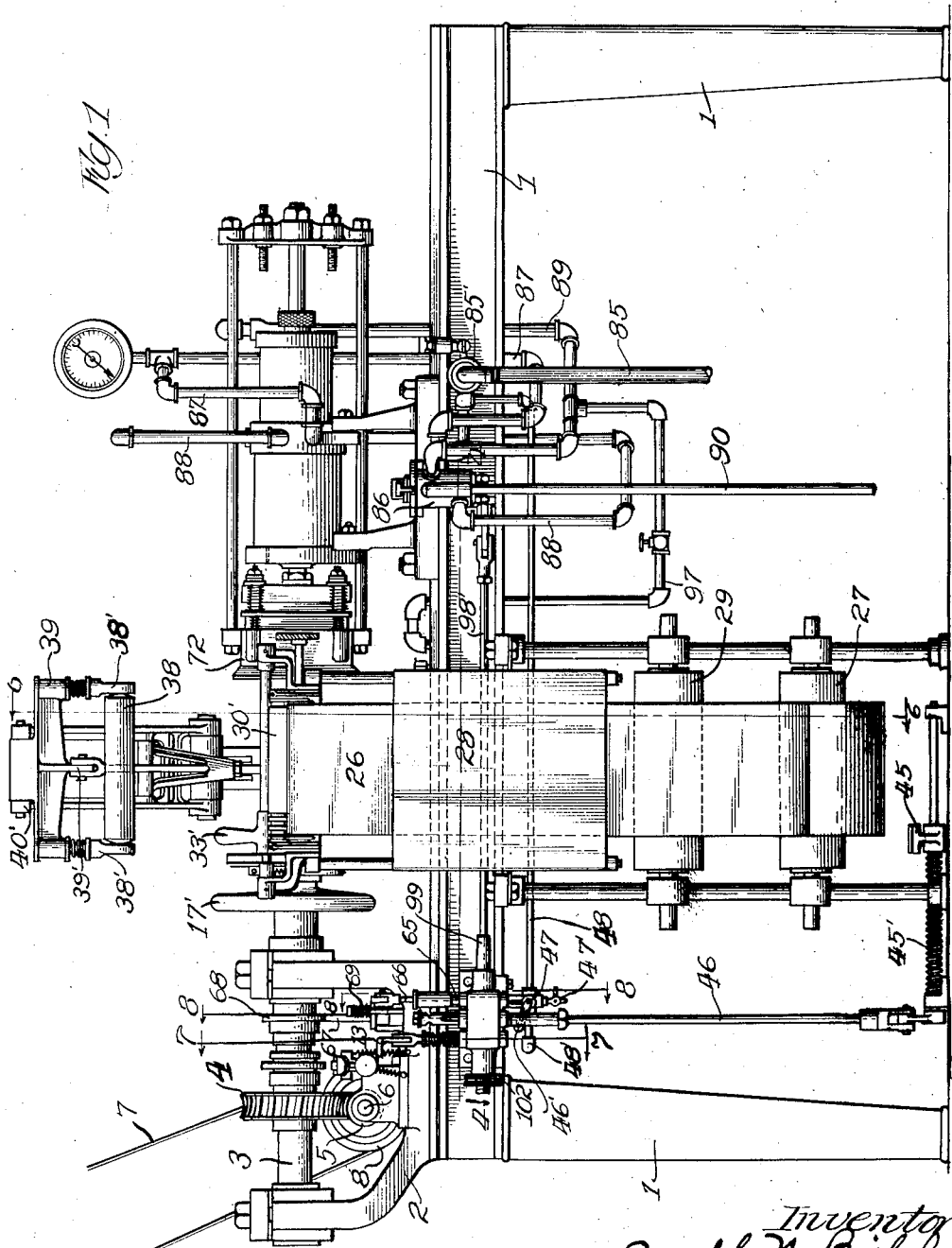

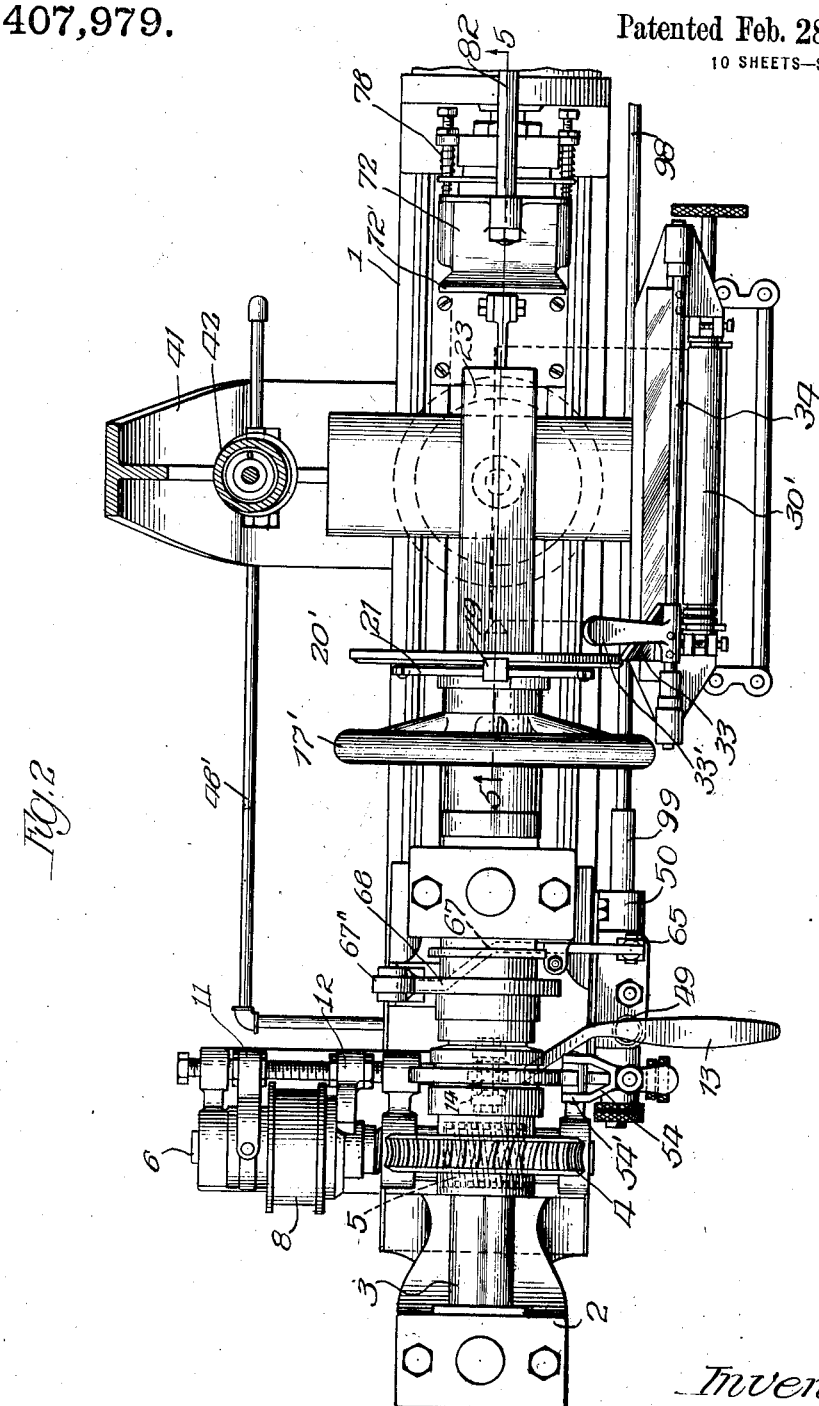

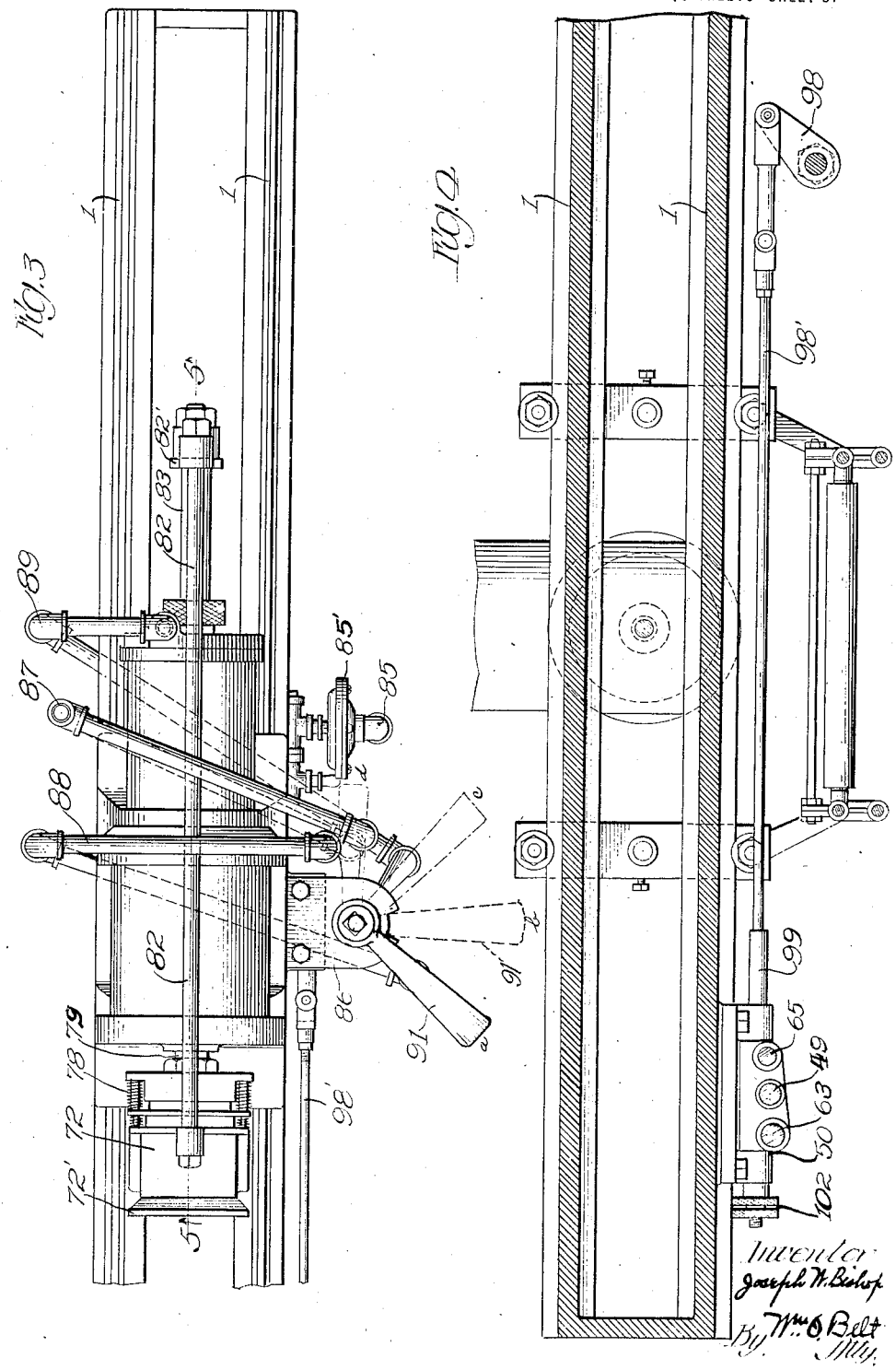

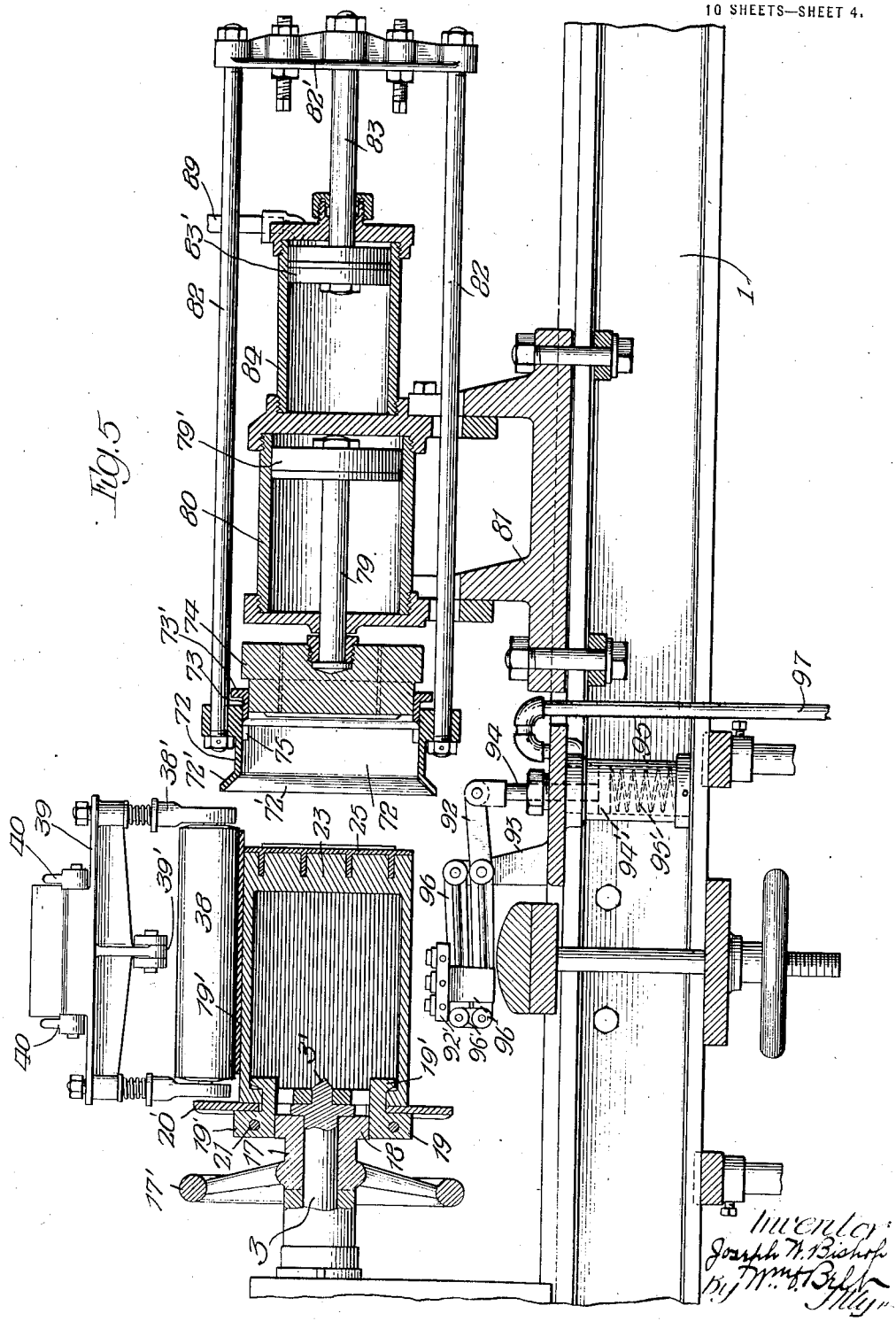

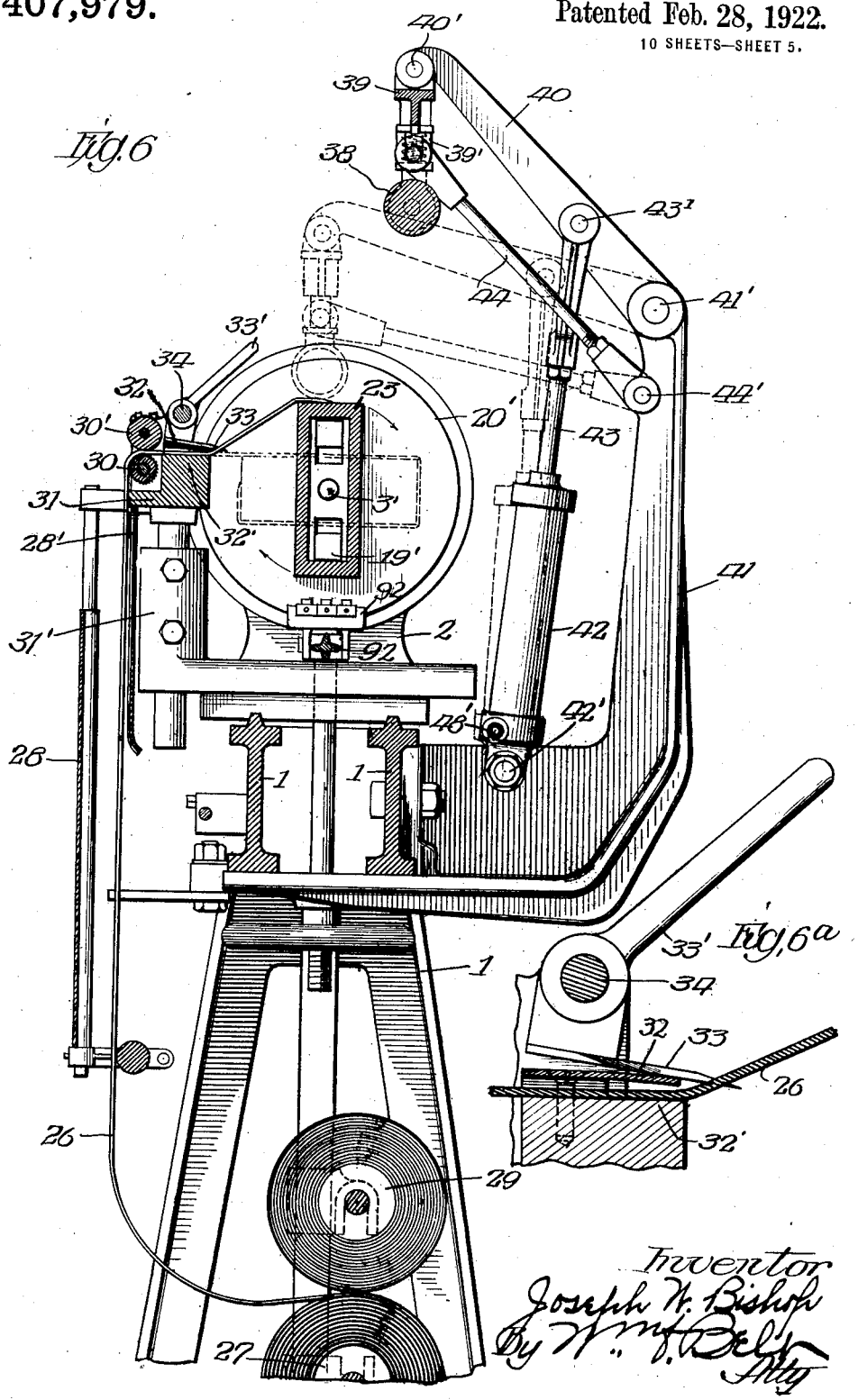

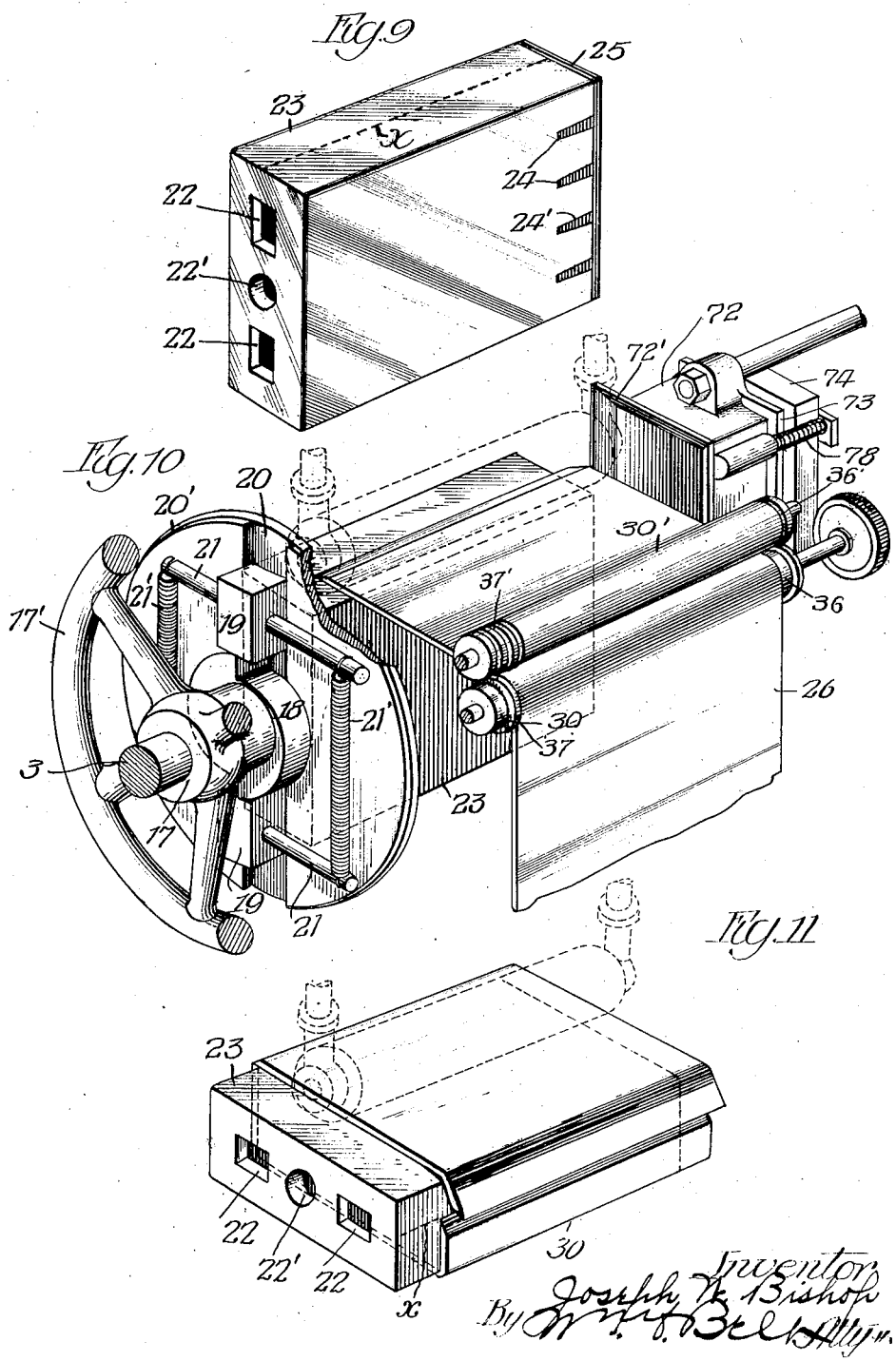

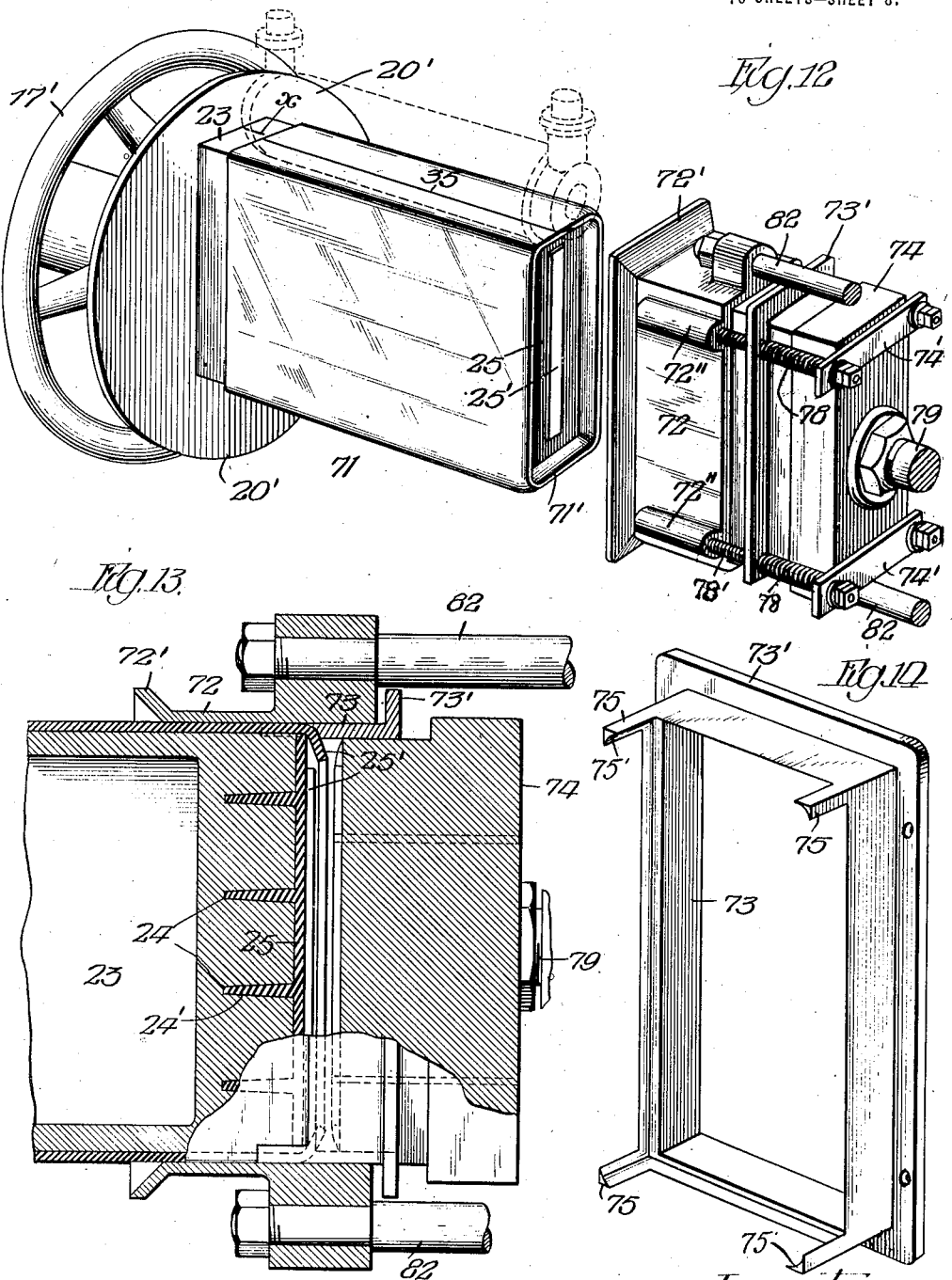

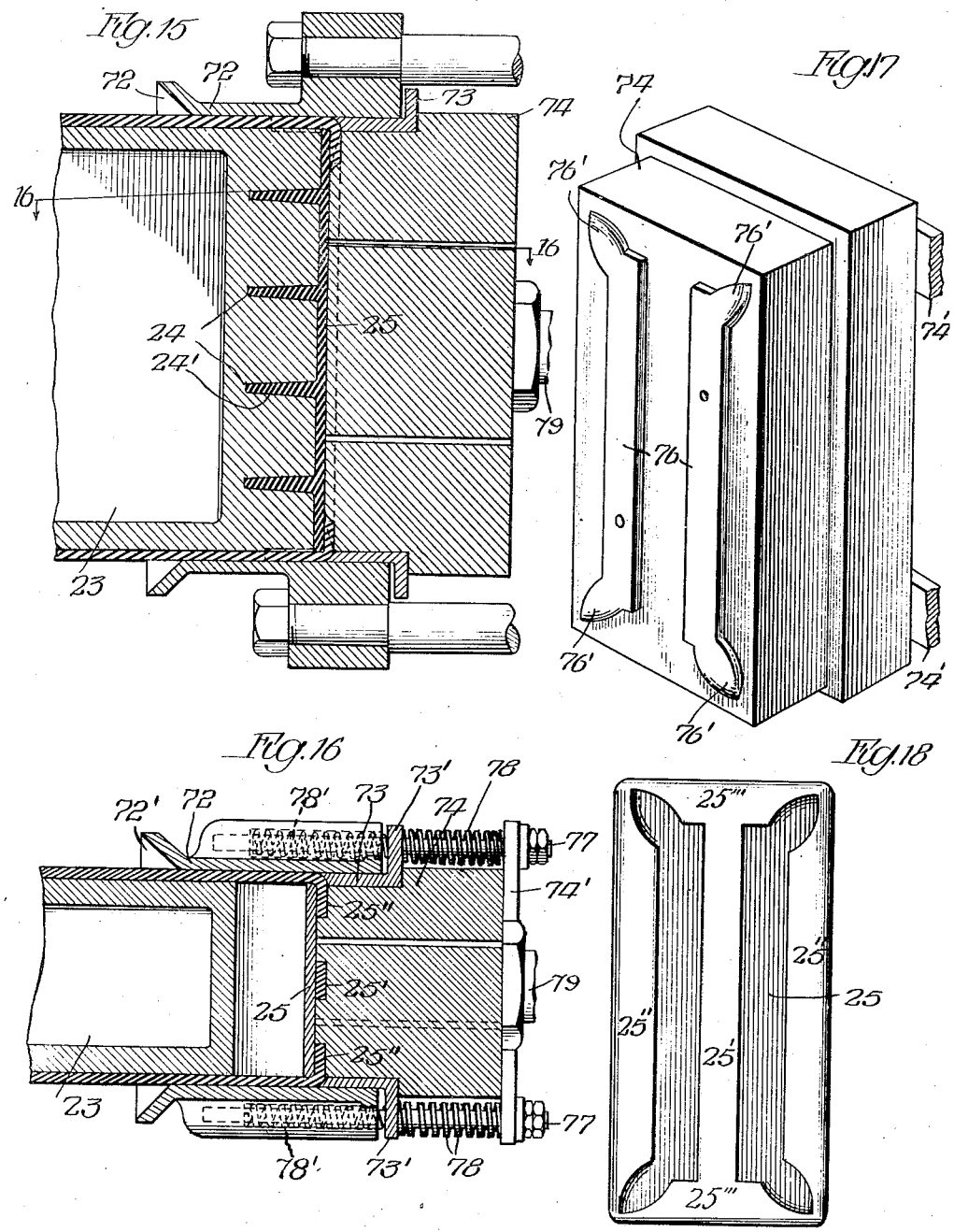

J. W. BISHOP.
MACHINE FOR MAKING BATTERY JARS AND OTHER HARD RUBBER RECEPTACLES.
APPLICATION FILED AUG. 15, 1919.
1,407,979.
Patented Feb. 28, 1922.
10 SHEETS—SHEET 10.
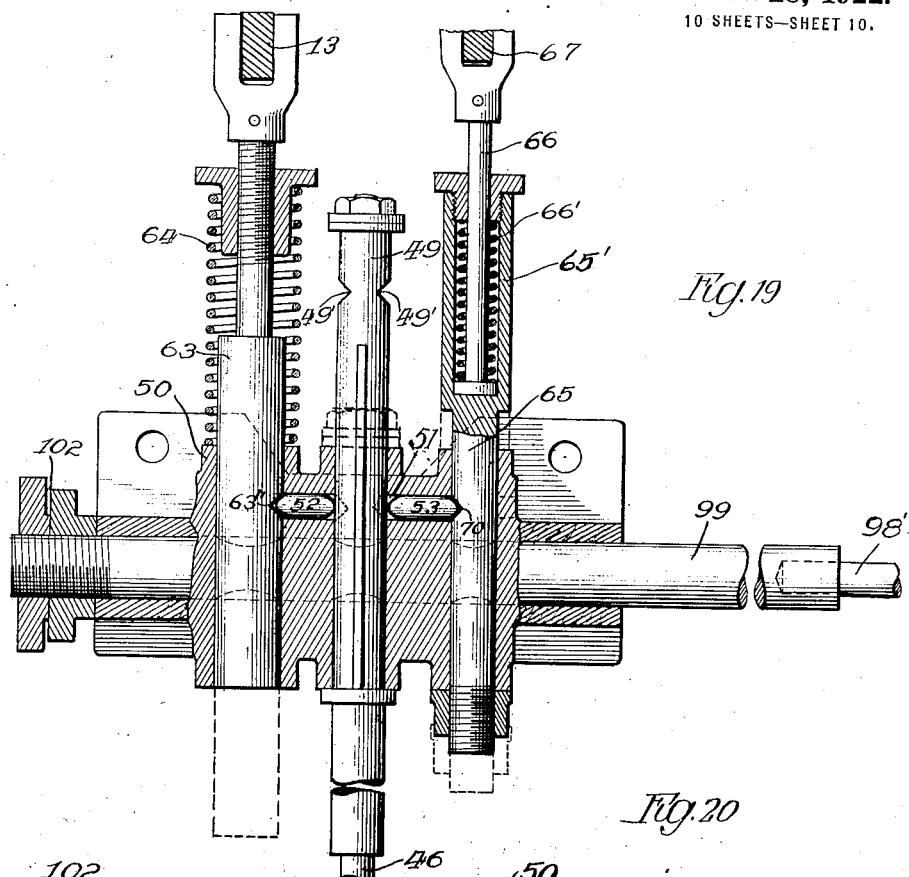
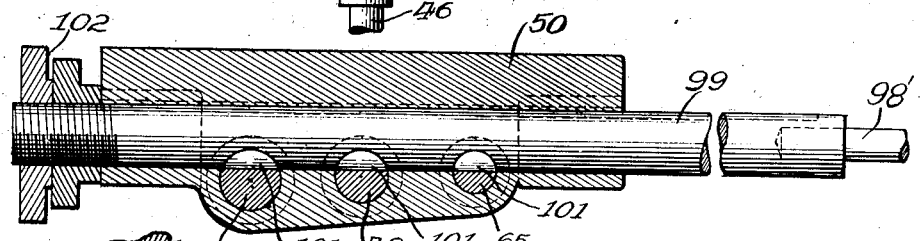
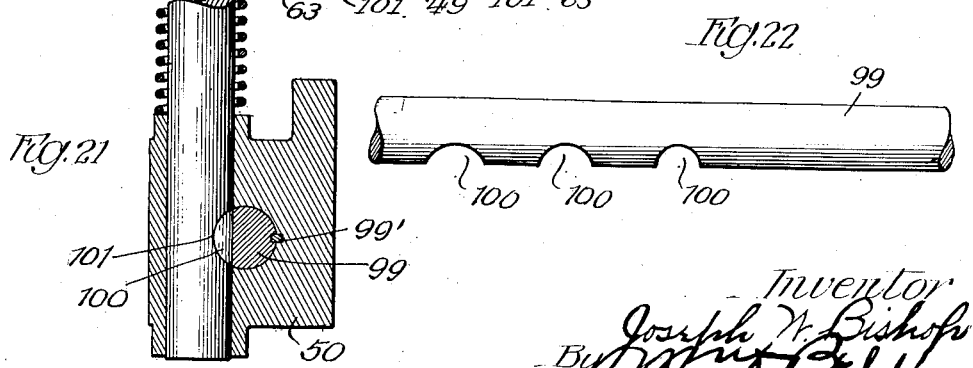

UNITED STATES PATENT OFFICE.

JOSEPH W. BISHOP, OF MUSKEGON, MICHIGAN, ASSIGNOR TO THE BRUNSWICK-BALKE-COLLENDER COMPANY, OF CHICAGO, ILLINOIS, A CORPORATION OF DELAWARE.

MACHINE FOR MAKING BATTERY JARS AND OTHER HARD-RUBBER RECEPTACLES.

1,407,979. Specification of Letters Patent. Patented Feb. 28, 1922.

Application filed August 15, 1919. Serial No. 317,702.

*To all whom it may concern:*

Be it known that I, JOSEPH W. BISHOP, a citizen of the United States, residing at Muskegon, in the county of Muskegon and State of Michigan, have invented certain new and useful Improvements in Machines for Making Battery Jars and other Hard-Rubber Receptacles, of which the following is a specification.

The object of this invention is, broadly, to provide a machine of simple construction for making hard rubber receptacles quickly and at low cost ready for vulcanization. Since the machine is especially useful for making battery jars I will confine the description and drawings to this particular adaptation with the distinct reservation that I do not limit the invention or restrict the scope of the claims thereby.

Heretofore battery jars have been principally made by hand, the work being comparatively slow, arduous and expensive. There is a lack of uniformity in the product made by the hand method and since a rather strict adherence to predetermined dimensions must be observed a considerable loss results from waste. This is due partly to the difficulties encountered in working with the soft rubber material used for making the jars and partly to the hand methods employed.

It is an important object of my invention, therefore, to provide a battery jar making machine which will produce a uniform product and thereby reduce the loss of waste in manufacture and at the same time improve the appearance and quality of the product.

Further objects of the invention are to provide the machine with safety devices to insure its proper operation in a predetermined sequence so that especial skill or physical strength will not be required to operate it; to provide, in addition to the safeties, for locking the machine in a neutral position so that none of the groups of mechanism may be operated; to provide simple means for adjusting the stock; to automatically stop the machine at the proper time for cutting the stock and at the completion of the wrapping operation; to provide a conveniently located tool for cutting the stock as required; to join the edges of the body neatly and uniformly and in such a manner that grinding is not required; to apply pressure yieldingly and intermittently for neatly folding the edges of the body upon the bottom of the jar and pressing the parts of the jar together in a compact, secure and uniform manner for vulcanization; and to apply an identification stamp upon each jar during the manufacture thereof.

The invention has other objects in view which will appear hereafter in the detail description.

In the accompanying drawings I have illustrated my invention as now embodied in a working machine, and referring thereto Fig. 1 is a front elevation of the machine;

Fig. 2 is a top plan view, partly in section, of a portion of the machine;

Fig. 3 is a top plan view of that portion of the machine not shown in Fig. 2;

Fig. 4 is a horizontal sectional view on the line 4—4 of Fig. 1;

Fig. 5 is a vertical sectional view on the line 5—5 of Fig. 3;

Fig. 6 is a transverse vertical sectional view on the line 6—6 of Fig. 1;

Fig. 6ᵃ is an enlarged sectional view;

Figs. 7 and 8 are transverse sectional views on the line 7—7 and 8—8, respectively, of Fig. 1;

Fig. 9 is a perspective view of a mandrel with the lugs and bottom of the jar applied thereto;

Fig. 10 is a detail perspective view, partly in section, showing the stock arranged in initial position on the mandrel;

Fig. 11 is a detail perspective view showing another position of the mandrel with the stock partly wrapped thereon just after being cut;

Fig. 12 is a detail perspective view showing the stock applied to the mandrel and the folding head arranged in relation thereto;

Fig. 13 is a sectional elevation showing the position of the parts when the forming die has engaged the stock and just prior to the engagement therewith of the folding die;

Fig. 14 is a perspective view of a forming die which I have used successfully in my machine;

Fig. 15 is a view similar to Fig. 13 showing the position of the forming and folding dies at the conclusion of the folding operation;

Fig. 16 is a sectional view on the line 16—16 of Fig. 15;

Fig. 17 is a perspective view of the folding die;

Fig. 18 is a bottom plan view of the jar at the conclusion of the forming and folding operations;

Figs. 19 to 22 are sectional views illustrating various parts of the safety locking devices.

In the drawings like numerals of reference indicate the same parts in the several figures and referring thereto 1 designates the main frame or base of the machine which may be of any suitable form and construction, and in this instance being provided with a bracket 2 supporting the main shaft 3 which is provided with a worm gear 4 meshing with a worm 5 on the drive shaft 6 (Figs. 1, 7). A belt 7 driven from any source of power drives a pulley 8 which is loosely mounted on the drive shaft and is adapted to be shifted into engagement with a clutch cone 9 to operate the drive shaft. A clutch rod 10 is mounted in the bracket 2 and is adjustably connected at 11 to the pulley 8. A brake 12 is adjustably mounted on the clutch rod to engage the cone as the pulley is withdrawn therefrom. A hand operated power lever 13 is pivoted at 14 on the bracket 2 and has a working connection at 15 with the clutch rod to shift the same and throw the clutch in. A spring 16 on the clutch rod will shift the rod in an opposite direction to throw the clutch out and apply the brake 12 to the cone to stop the drive shaft quickly and instantly.

The main shaft 3 is provided with a chuck (Figs. 5, 10) comprising a collar 17 mounted on the shaft and having a hand wheel 17' and a cam 18. Dogs 19 are slidably arranged in a groove 20 in the disk 20' and rods 21, extending through the rear ends of these dogs, are connected by springs 21' to hold the rear ends of the dogs in operative engagement with the cam 18. The hooked ends 19' of the dogs project forwardly through openings in the disk 20' to engage openings 22 in the mandrel 23 (Fig. 9). A dowel pin 3' on the end of shaft 3 is arranged to engage an opening 22' between the openings 22 to center the mandrel in the chuck. It will be readily understood that when the hand wheel 17' is turned to carry the high points of the cam away from the dogs the springs 21' will pull the dogs toward each other so that the mandrel can be centered on the dowel pin 3'; then the hand wheel is turned to move the dogs away from each other and thereby engage the hooked ends with the mandrel to secure the same rigidly in place in the chuck.

In forming the battery jar for vulcanization a mandrel is employed having slots 24 in one end thereof in which rubber pieces 24' are placed by hand to form the lugs in the bottom of the jar. A section of rubber 25 is then applied to the end of the mandrel over the lug pieces 24' to form the bottom of the jar and a rubber strip 25' is applied to the outer face of the section 25 to form a wear and supporting strip on the bottom of the jar. The rubber stock in the form of a wide strip 26 interwound with a muslin strip is carried by a supply roller 27 (Fig. 6), the rubber stock being carried up behind the apron 28 and in front of the apron 28' suitably supported on the frame of the machine. The muslin is wound on a take-up roller 29 as the stock and muslin leave the supply roller.

A corrugated feed roller 30 and a smooth pressure roller 30' are mounted one above the other in a frame 31 which is adjustably supported in a bracket 31' on the frame or base of the machine (Fig. 6). The stock passes from the rollers 30, 30' between a flexible plate 32 and a bed 32' on the frame and thence to the mandrel 23. A knife 33 is pivotally and slidably mounted on a rod 34 supported on the frame and is provided with a handle 33' by which the knife can be moved lengthwise of the supporting rod to cut the stock in the proper length for a complete wrapping around the mandrel. This knife is of angular shape (Fig. 2) and is supported for operation in a substantially horizontal position and it has a beveled edge to make a beveled cut in the stock so that one beveled edge of the wrapper will overlap the other beveled edge to make a flush, smooth and effective joint at 35 (Fig. 12) preferably in one end midway between the sides of the jar. In battery jar parlance the length of the jar is the dimension running lengthwise with the strip 25 and the width of the jar is the dimension running crosswise of the strip. This form of joint is neat in appearance, uniform in thickness and strong and efficient; it requires no grinding after the jar is vulcanized and thereby reduces the cost of manufacture.

To guide the stock to the mandrel evenly and uniformly I provide a rigid flange 36 at one end of the feed roller 30 to operate in a groove 36' in the pressure roller 30' (Fig. 10). I also provide an annular flange 37 which is adjustably mounted on the feed roller at its other end to engage one of the annular grooves 37' in the pressure roller. Starting and lighting battery jars are now made in a number of standard sizes and of three different heights in each size. I contemplate providing, so far as it may be necessary, a pressure roller for each standard size jar, each of said rollers having three annular grooves 37' therein spaced for the three heights of jars in this size. The stock is fed between the flange 36 and the flange 37 and is guided thereby properly to the mandrel so that it will be properly positioned on the mandrel each time to produce jars uniform in height as well as in other dimensions. This provides a simple means for quickly adjusting the machine to properly guide the stock to the mandrel.

The initial operation consists in registering the free beveled edge of the stock with a gage mark, after which the wrapping roller 38 is lowered into contact with the stock to wrap the stock smoothly over the mandrel as the latter revolves. This wrapping roller is mounted in bearings 38' (Fig. 1) yieldingly supported on a cross bar 39. The cross bar is pivotally connected to a lever 40 at its outer end 40', the inner end of this lever being pivotally mounted on an arm 41 at 41' (Fig. 6). A pressure cylinder 42 is pivoted at 42' to the arm 41 and is provided with a piston rod 43 which is pivotally connected at 43' to the lever 40 to operate the same. A rod 44 is pivotally connected at one end 44' to the arm 41 below the pivot connection 41' and at its other end with a downward projection 39' on the cross bar 39 to maintain the perpendicular position of the cross bar and the roller at all times and during the swinging movement of the lever 40.

The pressure for the wrapping roller cylinder 42 is controlled by a foot lever 45 (Fig. 1) which is normally held in elevated position by a strong spring 45'. The foot lever operates a rod 46 which is connected to the handle lever 46' of a three way cock 47 which is provided with a pet cock 47' for exhausting pressure from the cylinder 42. This valve is connected by a pipe 48 with the pressure supply through the control valve and with a pipe 48' with the cylinder 42. In the normal position of the machine, as shown in Fig. 6, the wrapping roller is held in elevated position by pressure in the cylinder 42. By operating the foot lever the three way valve will be turned in a familiar way to shut off the supply pressure and to allow the pressure in the cylinder to exhaust back through the pipe 48', the valve 47 and the pet cock 47' to the atmosphere. When air is exhausted from the cylinder 42 the wrapping roller falls by gravity to the dotted line position shown in Fig. 6 in engagement with the stock and it remains in this position resting upon the stock and wrapping the stock about the mandrel during a complete revolution of the mandrel. At the conclusion of the wrapping operation the means for locking the foot lever rod 46 and the wrapping roller are released, whereupon spring 45' raises rod 46 to operate valve 47 and admit pressure to cylinder 42 which raises the wrapping roller to its elevated position shown in full lines in Fig. 6. On the upper end of the rod 46 there is a locking bar 49 (Fig. 19) which is slidably arranged in a locking head 50. This foot lever locking bar has oppositely disposed notches 49' which are arranged to be registered with the transverse opening 51 in the locking head when the foot lever is depressed. Locking tumblers 52, 53 are located in said transverse passage on opposite sides of the bar 49 and the ends of these tumblers are adapted to enter the notches 49', when the locking bar 49 is lowered, for a purpose about to be described.

After the wrapping roller has been engaged with the stock, as indicated in dotted lines in Fig. 6, the next step is to revolve the mandrel about three-fourths of its revolution to the position indicated in dotted lines in Fig. 6. During this operation the stock is applied to and smoothed over the greater portion of the mandrel and the mandrel is stopped in horizontal position, so that when the stock is cut by operating the knife 33 there will be just enough of the stock severed to be smoothed over the remainder of the mandrel with its edge abutting against the other edge of the stock. This provides for cutting just enough of the stock to insure a complete wrapping, without any surplus which would produce an undesirable enlargement or protuberance at the joint. The beveled edges of the stock form an overlapping joint of sufficient width to insure safety and security and to produce a joint of the same thickness as the rest of the wrapping.

To apply power to the main shaft 3 for revolving the mandrel intermittently I provide the power lever 13 heretofore described. When this lever is depressed the clutch rod 10 is shifted to the left, as indicated in broken lines in Fig. 7, to throw the clutch in and operate the shaft 6 and through the worm 5 and gear 4 rotate the shaft 3 to revolve the mandrel. To hold the clutch rod in its shifted position to the left against the tension of spring 16 and time the intermittent operation of the mandrel I pivot a lever 54 and a latch 55 at 56 on the bracket. The lever 54 carries a roller 54' on its inner end which travels on a cam disk 57 on the main shaft 3. This disk has two cams 58 and 59 which are adapted to operate the latch lever 54 at predetermined intervals in the rotation of the main shaft 3 and the mandrel so that they will be brought to a stop for the stock cutting operation heretofore described and for the folding or pressing operation to be described.

The latch 55 has an opening 55' through which projects an arm 54'' on the lever 54. A spring 60 attached at one end to the latch 55 and at its other end to a fixed part of the machine normally operates to hold the roller 54' in contact with the cam disk 57. The latch 55 has a projection 55'' which is arranged to engage behind a stop collar 61 on the threaded front end of the clutch rod 10. This collar is secured in adjusted position on the rod by a lock nut 61'. In normal position the cam 59 holds the latch device out of operative engagement with the clutch rod collar but when the clutch rod is shifted to the left (Fig. 7) to throw the clutch in and operate the main shaft 3 the cam 59 will pass beyond the roller 54' and permit spring 60 to swing lever 54 on its pivot until the projection 55'' engages behind the stop collar 61 to hold the clutch rod temporarily in position for applying power to the main shaft. When cam 58 engages roller 54' it will swing the latch lever on its pivot and release the projection 55'' from engagement with the stop collar 61, whereupon spring 16 shifts the clutch rod to the right (Fig. 7) to throw out the clutch. The cam 58 will operate to stop the main shaft and the mandrel carried thereby in the position indicated in broken lines in Fig. 6 for the stock cutting operation; the cam 59 is located to stop the main shaft and the mandrel at the conclusion of the wrapping operation.

To provide a fine adjustment of parts and insure the proper intermittent operation of the mandrel at all times I arrange an adjusting screw 62 in the latch 55 to bear upon the arm 54''. By adjusting this screw the position of the projection 55'' with relation to the roller 54' may be varied to increase or decrease the contact engagement of said projection with the collar 61 as may be required to provide for proper positioning of the mandrel.

A locking bar 63 is pivoted at 63' to the power lever 13 (Figs. 7, 19) and operates in the locking head 50 on one side of the foot lever locking bar 49. A spring 64 holds this power lever normally in elevated position. This locking bar 63 has a notch 63'' in one side thereof which is engaged by tumbler 52. It will be noted by reference to Fig. 19 that the locking bar 63 and the power lever will be locked in normal position by the tumbler 52 when the foot lever is in its normal elevated position. When the foot lever is depressed as heretofore described and notch 49' is registered with the passage 51, the tumbler 52 is free to move to the right (Fig. 19) into notch 49' and thereby release the power lever locking bar 63 so that the power may be applied for revolving the mandrel as heretofore described. When the power lever is depressed for thus applying the power, its locking bar 63 will hold tumbler 52 in locking engagement with the notch of the foot lever locking bar 49 and lock the foot lever in depressed position. By thus locking the foot lever the wrapping roller is held in operative engagement with the stock on the mandrel while the power lever is lowered and the mandrel is turning. When the mandrel is revolved approximately three-fourths of its revolution it automatically stops in position to have the stock cut and the power lever is then returned to normal position by the spring 64. After the cutting operation the operator again depresses the power lever to effect the completion of the revolution of the mandrel and the wrapping operation.

Another locking bar 65 is slidably mounted in the locking head 50 and is provided at its upper end with a spring chamber 65' (Fig. 19). A rod 66 engaged in this chamber with a spring 66' is pivotally connected at its upper end to one arm of a bell crank 67 pivoted at 67' on the bracket 2 (Fig. 8). The other arm of this bell crank carries a roller 67'' which operates in engagement with a disk 68 mounted on the main shaft 3 and having a peripheral cam 68'. A spring 69 operating on the bell crank cooperates with the spring 66' to hold the roller 67'' in operative engagement with the cam disk 68. The tumbler 53 engages a notch 70 in the locking bar 65 when the foot lever is in normal elevated position (Fig. 19). The cam 68' holds the interlocking bar 65 in elevated position while the foot lever is in elevated position, the tumbler 53 being held in locking engagement with the notch 70 by the foot lever locking bar 49 at such time. But when the foot lever is operated the tumbler 53 may enter notch 49', thereby releasing the interlocking bar 65 and after the power lever is operated and the main shaft 3 rotated sufficiently to carry cam 68' away from roller 67'' the spring 69 swings bell crank 67 on its pivot and depresses interlocking bar 65 to hold tumbler 53 in locking engagement with the foot lever locking bar. This foot lever locking bar is locked in depressed position continually by the interlocking bar 65 through the tumbler 53 throughout the wrapping operation. The interlocking bar is operated immediately after the power lever has been operated and remains in its depressed locking position until the wrapping operation is complete, whereupon cam 68' returns the interlocking bar to its normal elevated position (Fig. 19) permitting tumbler 53 to enter notch 70 and, the power lever locking bar having returned to its normal elevated position, (Fig. 19) the tumblers will then be free to shift outwardly from the notches 49' so that the foot lever locking bar 49 may be returned to its elevated position by the spring 45'.

The rubber stock is soft and pliable and it is wrapped smoothly on the mandrel by the wrapping roller under just sufficient pressure to form the body 71 of the jar (Fig. 12). The end of the body which is now to be folded upon the bottom 25 projects beyond the mandrel and the tension of the stock is such that the projecting edges 71' will be pulled in slightly around the corners as shown and inwardly inclined at the edges between the corners so that these edges will fold inwardly upon the bottom neatly and uniformly during the folding operation.

When the wrapping operation is completed the locking bars have been returned to their normal locked position, (Fig. 19) and the several groups of mechanism hereinbefore described and employed during the wrapping operation are held in locked position, with the mandrel properly centered, during the complete folding operation.

The folding head comprises a head frame 72, a folding die 73 and a forming die 74 (Figs. 12-17). The head frame is hollow and of just the right size to receive the wrapped mandrel. It is preferably provided with a flaring mouth 72' to facilitate engagement with the work. The folding die (Fig. 14) is rectangular in shape and comprises the corner posts 75 having curved inner faces 75', and the peripheral flange 73'. The folding die works within the folding head frame and the forming die 74 works within the folding die. The forming die is provided on its face with parallel strips 76 and with diagonally disposed corner projections 76'. The strips are arranged to engage the bottom 25 of the jar (Fig. 18) at the sides of the center strip 25' and within the edges of the wrapper which are folded in to form the strips 25'' of the bottom. The corner projections 76' are tapered to engage the corner portions of the folded bottom edges of the wrapper and thus dispose of the fullness or excess material which is present at the corners during the forming operation. These projections distribute the material from the corners so that very little, if any, grinding is required to level the bottom supporting surfaces of the jar formed by the strips 25' and 25'' and the folded in ends 25'''. The dies are supported in the frame on rods 77 which engage legs 72'' on the frame, the flange 73' on the folding die and cross pieces 74' on the back of the forming die. Comparatively strong springs 78 are arranged on these rods between the flange 73' and the cross pieces 74' and lighter springs 78' are arranged on the rods between the frame and the flange 73' so that when the folding head is moved up to the work the folding die may operate yieldingly to press the edges 71' of the wrapper inwardly upon the bottom 25, as shown in Fig 13, before the forming die engages the work. The forming die engages the work directly and also presses upon the folding die so that the two dies may cooperate to fold the edges 71' properly and form the bottom of the jar (Figs. 16, 18).

The forming die 74 is carried by a piston rod 79 (Fig. 5) operating in the pressure cylinder 80 which is suitably mounted on a bracket 81 fastened to the main frame. The folding head frame 72 is carried by rods 82 which are connected by a cross head 82' to the piston rod 83 which operates in the pressure cylinder 84 mounted on one end of the cylinder 80. A piston 79' is mounted on the piston rod 79 and a piston 83' is mounted on the piston rod 83.

A pressure pipe 85 (Figs. 1, 3) leads through a strainer 85' to a control valve 86. A pipe 87 leads from the control valve to the large cylinder 80 behind the piston therein; a pipe 88 leads from the control valve to the small cylinder 84 behind the piston therein; a pipe 89 connects the control valve with the small cylinder 84 in front of the piston therein and an exhaust pipe 90 is connected with the control valve and opens to the atmosphere.

When the control lever 91 for operating the control valve is in neutral position $b$ pressure is entirely shut off from the machine and, as will be described later, all of the groups of mechanism of the machine are locked. The control lever is engaged with the control valve so that it may be detached in neutral position, thereby effectually locking the entire machine.

In the operation of the folding head the control lever is first turned to position $a$ in which pressure is admitted to and maintained in the small cylinder 84 in front of the piston to hold the folding head in retracted position during the wrapping operations. Then the control lever is thrown to position $c$ in which pressure is admitted behind the piston 83' and exhausted from in front of said piston to move the folding head into operative engagement with the work. Then the control lever is turned to position $d$ in which pressure is admitted behind piston 79' to operate the dies. Then the control lever is moved to initial position $a$, pressure is exhausted from behind pistons 79' and 83' and admitted in front of piston 83' to retract the folding head.

To apply a stamp to the jar, while it is being made, for identification or other purposes, I pivot a lever 92 on a bracket 93 and connect one end to a piston rod 94 which operates a piston 94' in cylinder 95. A spring 95' normally holds the piston in elevated position. A connecting bar 96 is pivoted at one end to the bracket 93 and at its other end to a link 96' which is connected to the outer end of lever 92. A suitable stamper 92' is detachably mounted on the bar 96. This construction maintains the stamper in horizontal relation to the work to make a clear and distinct impression thereon. A pipe 97 is connected to the pipe 89 and to cylinder 95 to supply pressure thereto above the piston to operate the stamper when the folding head is moved up to the work. Provision may be made to operate the stamper at some other stage of the operation than that described, if so desired.

The control valve plug is connected by an arm 98 (Fig. 4) to a rod 98' which carries a locking bar 99 slidably arranged in the locking head 50 and provided with a key 99' to prevent turning (Fig. 21). This locking bar extends transversely of the vertical locking bars 49, 63 and 65 (Figs. 19–21) and is provided with recesses 100, one for each of said vertical locking bars. The transverse locking bar intersects the openings in the locking head in which the vertical locking bars travel and these recesses register with said openings when the control lever is shifted to initial operating position $a$ so that the vertical locking bars may operate during the wrapping and cutting operations as heretofore described. The vertical locking bars are also provided with recesses 101 to register with the transverse locking bar when the wrapping and cutting operations are completed and these groups of mechanism are at rest. When it is desired to lock the machine as an entirety the control lever is shifted to neutral position $b$. This moves rod 98' and locking bar 99 to the left (Fig. 20) and engages round portions of said bar adjacent the recesses 100 with the vertical locking bars. Then the foot lever and the power lever are locked, and when the control lever is removed, which may be effected in a suitable manner (as in the case of a control lever on an electric street car) the entire machine is locked. Nuts 102 on the end of locking bar 99 enable proper adjustment of the bar.

My invention is designed for use in a certain cycle of operations and provision is made for locking the parts so that the regular succession of operations must be followed. This not only prevents liability of damage to the machine but it also avoids the necessity of providing especially skilled operators for the machine. During the wrapping and cutting operations the folding mechanism is locked so that the folding head cannot be advanced to the mandrel until the latter is properly positioned to receive said head. The wrapping mechanism, including the foot lever and the power lever and the parts associated therewith are all locked during the folding operation. And the entire machine is locked when the machine is not in use. These safety provisions are especially important in a machine having numerous operations, to be successively performed, to prevent the expense and loss which would result from accidents due to improper operation.

In practice I have found that the machine does its work in an efficient manner and produces jars of uniform size and shape and of superior quality. After the operations previously described are completed the mandrel is removed from the machine with the jar thereon and placed in the vulcanizer. After vulcanization any rough spots are ground down but very little of this work is required.

My machine is rapid in operation and greatly expedites the production of jars. In the manufacture of jars by hand there is always a considerable waste of stock, but there is no such waste with my machine and the uniformity of the work insures a regular production.

The machine may be employed or adapted for making other receptacles than battery jars, and as before stated, I desire to have it clearly understood that the claims are to be so construed in any consideration of the patent.

I am aware that changes in the form and proportion and arrangement of parts of my invention may be made without departing from the spirit or sacrificing the advantages thereof and I therefore reserve the right to make all such changes as fairly fall within the scope of the following claims.

I claim:

1. In a machine of the class described, the combination of a mandrel, means for feeding the stock to the mandrel, means for revolving the mandrel to wrap the stock thereon, means for automatically stopping the mandrel before the wrapping operation is completed, and means for cutting the stock to the length required for completing the wrapping on the mandrel.

2. In a machine of the class described, the combination of a mandrel, means for feeding the stock to the mandrel, means for revolving the mandrel to wrap the stock thereon, means for automatically stopping the mandrel after it has completed about three-fourths of a revolution, and means for cutting the stock to the length required for completing the wrapping on the mandrel.

3. In a machine of the class described, the combination of a mandrel, means for feeding the stock to the mandrel, means for revolving the mandrel to wrap the stock thereon, and means for cutting the stock with a bevel edge at each complete operation of the machine and to the proper length for a complete wrapping so that the bevel edges of the stock will abut on the mandrel.

4. In a machine for making battery jars, the combination of a mandrel, means for feeding the stock to the mandrel, means for revolving the mandrel to wrap the stock thereon, and positive means for smoothing the stock on the mandrel as the latter is revolved.

5. In a machine for making battery jars, the combination of a mandrel, means for feeding the stock to the mandrel, positive means for revolving the mandrel to wrap the stock thereon, and pressure means automatically engaged with the stock on the mandrel before it begins to revolve and held in engagement with the stock to smooth the stock on the mandrel during the wrapping operation.

6. In a machine of the class described, the combination of a mandrel, means for feeding the stock to the mandrel, means for revolving the mandrel intermittently to wrap the stock thereon, means for applying pressure to the stock on the mandrel before the latter begins to revolve and continuing the pressure throughout the revolution of the mandrel to smooth the stock thereon, and means for cutting the stock during a period of rest in the revolution of the mandrel to the length required for completing the wrapping on the mandrel.

7. In a machine of the class described, the combination of a mandrel, means for feeding the stock to the mandrel, means for revolving the mandrel to wrap the stock thereon, a pressure roller for smoothing the stock on the mandrel, means for engaging said pressure roller with the stock on the mandrel before the mandrel begins to revolve and continuing said engagement throughout the revolution of the mandrel, means for automatically stopping the revolution of the mandrel after it has completed approximately three-fourths of a revolution, and means for cutting the stock, during the period of rest of the mandrel, to a length required to complete the wrapping on the mandrel.

8. In a machine of the class described, the combination of a mandrel, means for feeding the stock to the mandrel, a pressure roller normally elevated above wrapping position, means for engaging said pressure roller with the stock when the latter has been applied to the mandrel at the beginning of the wrapping operation, independent means for intermittently operating the mandrel to wrap the stock thereon, means for stopping the revolution of the mandrel before the wrapping operation is completed, and means for cutting the stock during the period of rest of the mandrel to the length required for completing the wrapping on the mandrel.

9. In a machine for making battery jars, the combination of a mandrel, means for feeding the stock to the mandrel, means for smoothing the stock on the mandrel, and independent means for revolving the mandrel to wrap the stock thereon.

10. In a machine of the class described, the combination of a mandrel, means for feeding the stock to the mandrel, means for smoothing the stock on the mandrel, and means for intermittently revolving the mandrel to wrap the stock thereon.

11. In a machine for making battery jars, the combination of a mandrel, means for feeding the stock to the mandrel, independent means for revolving the mandrel to wrap the stock thereon, and pressure means for smoothing the stock on the mandrel comprising a pressure roller, pivotal means for supporting said pressure roller normally out of wrapping position, and means for moving said pressure roller into operative engagement with the stock on the mandrel.

12. In a machine of the class described, the combination of a mandrel, means for feeding the stock to the mandrel, means for revolving the mandrel to wrap the stock thereon, and pressure means for smoothing the stock on the mandrel comprising a pressure roller, pivotal means for supporting said pressure roller normally out of wrapping position, a pressure cylinder, a piston operating in said cylinder and connected with said pivotal means, and means for supplying pressure to said cylinder to maintain the roller in elevated position and for exhausting pressure from said cylinder to provide for engagement of the roller with the stock on the mandrel.

13. In a machine of the class described, the combination of a mandrel, means for feeding the stock to the mandrel, means for revolving the mandrel to wrap the stock thereon, and pressure means for smoothing the stock on the mandrel comprising a pressure roller, pivotal means for supporting said pressure roller normally out of wrapping position, a pressure cylinder, a piston operating in said cylinder and connected with said pivotal means, means for supplying pressure to said cylinder to maintain the roller in elevated position and for exhausting pressure from said cylinder to provide for engagement of the roller with the stock on the mandrel, and a foot lever for operating said pressure means.

14. In a machine of the class described, the combination of a mandrel, means for revolving the mandrel to wrap the stock thereon, means for feeding the stock to the mandrel comprising rollers through which the stock passes, and a knife arranged between said rollers and the mandrel for cutting the stock.

15. In a machine of the class described, the combination of a mandrel, means for revolving the mandrel to wrap the stock thereon, means for feeding the stock to the mandrel comprising rollers through which the stock passes, and a knife mounted between the rollers and the mandrel to slide transversely of the stock and to cut the stock to the proper length for a complete wrapping on the mandrel.

16. In a machine of the class described, the combination of a mandrel, means for revolving the mandrel to wrap the stock thereon, means for feeding the stock to the mandrel comprising rollers through which the stock passes, and a knife pivotally and slidably mounted between the rollers and the mandrel to cut the stock to the proper length for a complete wrapping on the mandrel.

17. In a machine of the class described, the combination of a mandrel, means for revolving the mandrel to wrap the stock thereon, means for feeding the stock to the mandrel comprising rollers through which the stock passes, and a knife slidably mounted between the rollers and the mandrel and spaced from the mandrel to cut the stock, after it has been wrapped partly on the mandrel, to the proper length for completing the wrapping on the mandrel.

18. In a machine of the class described, the combination of a mandrel, means for revolving the mandrel to wrap the stock thereon, means for feeding the stock to the mandrel comprising rollers through which the stock passes, and a knife slidably mounted between the rollers and the mandrel and spaced from the mandrel to cut the stock to the length required for completing the wrapping on the mandrel when the stock has been wrapped approximately three-fourths of the distance around the mandrel.

19. In a machine of the class described, the combination of a mandrel, means for feeding the stock to the mandrel, and means for revolving the mandrel to wrap the stock thereon comprising a main shaft carrying the mandrel, a drive shaft, connections between the drive shaft and the main shaft, means for applying power to the drive shaft comprising a clutch, a power lever for operating the clutch, and automatic means for releasing the clutch to stop the mandrel.

20. In a machine of the class described, the combination of a mandrel and means for revolving the mandrel to wrap the stock thereon comprising a main shaft, a drive shaft for operating the main shaft, means for applying power to the drive shaft comprising a clutch, a power lever for operating the clutch, and means for automatically releasing the clutch and comprising a cam on the main shaft for actuating said releasing means.

21. In a machine of the class described, the combination of a mandrel and means for revolving the mandrel to wrap the stock thereon comprising a main shaft, a drive shaft for operating the main shaft, means for applying power to the drive shaft comprising a clutch, a rod for operating the clutch, a lever for operating said rod, a latch device for holding the rod in clutch engaging position, and a cam on the main shaft for releasing said latch device.

22. In a machine of the class described, the combination of a mandrel and means for revolving the mandrel to wrap the stock thereon comprising a main shaft, a drive shaft for operating the main shaft, means for applying power to the drive shaft comprising a clutch, a rod for operating the clutch, a lever for operating said rod, a latch device for holding the rod in clutch engaging position, means for adjusting said latch device with relation to said clutch rod, and a cam on the main shaft for releasing said latch device.

23. In a machine of the class described, the combination of a mandrel and means for revolving the mandrel to wrap the stock thereon comprising a main shaft, a drive shaft for operating the main shaft, means for applying power to the drive shaft comprising a clutch, a rod for operating the clutch, a lever for operating said rod, a collar on the clutch rod, a latch device having a projection to engage said collar to hold the clutch rod in clutch engaging position, and means for releasing said latch device.

24. In a machine of the class described, the combination of a mandrel, means for revolving the mandrel to wrap the stock thereon comprising a main shaft, a drive shaft connected to the main shaft for operating the same, means for applying power to the drive shaft comprising a clutch, a movable spring controlled rod for operating the clutch, a power lever for operating the rod, a collar on the rod, a latch device arranged to engage the collar to hold the rod temporarily in position for engaging the clutch, means for operating said latch device comprising a cam on the main shaft, and means on the latch device for adjusting the same relative to the collar.

25. In a machine of the class described, the combination of a mandrel, means for feeding the stock to the mandrel, means for revolving the mandrel to wrap the stock thereon, a main shaft carrying the mandrel, means for operating said main shaft, and cams on the main shaft for controlling said operating means to actuate the main shaft intermittently.

26. In a machine of the class described, the combination of a main shaft, a chuck on said shaft comprising a cam, a hand wheel for operating said cam, and a pair of spring controlled dogs adapted to be operated by said cams and having hook ends to engage a mandrel.

27. In a machine of the class described, the combination of a main shaft, a chuck on said shaft comprising a cam, a hand wheel for operating said cam, a disk having a transverse groove therein, and a pair of yieldingly connected dogs slidably mounted in said groove and adapted to be operated by said cam to engage a mandrel.

28. In a machine of the class described, the combination of a main shaft, a chuck on said shaft comprising a cam, a hand wheel for operating said cam, a disk having a transverse groove therein, a pair of dogs slidably mounted in said disk and having hook ends to engage a mandrel and adapted to be operated by said cam, and a yielding connection between said dogs.

29. In a machine of the class described, the combination with a mandrel having a pair of openings in one end thereof, of a main shaft, a chuck on said main shaft comprising a pair of dogs having hook ends to engage the openings in the mandrel, a cam for operating said dogs, a yielding connection between the dogs, and a hand wheel for operating the cam.

30. In a machine of the class described, the combination of a mandrel, means for feeding the stock to the mandrel, means for revolving the mandrel to wrap the stock thereon, and forming means for pressing inwardly the edges at one end of the stock on the mandrel.

31. In a machine of the class described, the combination of a mandrel, means for feeding the stock to the mandrel, means for revolving the mandrel to wrap the stock thereon, and folding means for pressing the edges at one end of the stock on the mandrel.

32. In a machine of the class described, the combination of a mandrel, means for feeding the stock to the mandrel, means for revolving the mandrel to wrap the stock thereon, and forming and folding means for folding the edges of the stock at one end of the mandrel inwardly and against the end of the mandrel.

33. In a machine of the class described, the combination of a mandrel, means for feeding the stock to the mandrel, means for revolving the mandrel to wrap the stock thereon, a forming die, a folding die, and means for advancing said dies progressively to fold the edges of the stock at one end of the mandrel thereon.

34. In a machine of the class described, the combination of a mandrel, means for applying a wrapper thereto with one edge projecting beyond the end of the mandrel, and means for engaging said projecting edge to fold the same upon the end of the mandrel.

35. In a machine of the class described, the combination of a mandrel having a wrapper applied thereto with one edge projecting beyond the end of the mandrel, a folding head comprising a frame and folding dies, and means for advancing said head to the work and for actuating said dies.

36. In a machine of the class described, the combination of a mandrel having a wrapper applied thereto with one edge thereof projecting beyond the end of the mandrel, a folding head comprising a frame adapted to engage the projecting edge portion of the wrapper-surrounded mandrel, a forming die and a folding die for folding said edges upon the end of the mandrel, and means for operating said head and dies successively.

37. In a machine of the class described, a folding die having projecting corner posts to engage the corners of the jar.

38. In a machine of the class described, a folding die having corner posts with curved inner faces to engage the corners of the jar.

39. In a machine of the class described, a folding die having corner posts with curved inner faces to engage the corners of the jar, and a peripheral flange.

40. In a machine of the class described, a forming die having a pair of parallel strips fastened to the face thereof.

41. In a machine of the class described, a forming die having projections on its face and at the corners thereof.

42. In a machine of the class described, a forming die having tapered projections on its face and at the corners thereof.

43. In a machine of the class described, a folding die having a pair of parallel strips on its face and tapered projections adjacent its corners.

44. In a machine of the class described, a folding head comprising a hollow frame, a folding die operating in said frame, and a forming die operating in said forming die.

45. In a machine of the class described, the combination of a mandrel, a folding head comprising a hollow frame, a folding die, a forming die, comparatively light springs between the frame and the folding die and comparatively heavy springs between the folding die and the forming die, and means for operating said dies.

46. In a machine of the class described, the combination of a mandrel, a forming head comprising a frame and a folding die operating therein, pressure operated means for moving said head to the work, and pressure means for operating said dies.

47. In a machine of the class described, the combination of a mandrel, a folding head comprising a frame and a die operating therein, and pressure means for successively operating said frame and die comprising a single control valve.

48. In a machine of the class described, the combination of a mandrel, a folding head comprising a frame and a forming die, a cylinder, a piston operating in said cylinder and connected to said frame, pressure means for operating said piston, another cylinder, a piston operating in said last mentioned cylinder connected to the die, and pressure means for operating said last mentioned piston.

49. In a machine of the class described, the combination of a mandrel, means for applying a wrapper thereto, means for folding the edges at one end of the wrapper, and means for applying a stamp to one side of the wrapper.

50. In a machine of the class described, the combination of a mandrel, means for revolving the mandrel, means for applying pressure to the stock on the mandrel during the revolution of the latter, and means for automatically locking said pressure means in operative position.

51. In a machine of the class described, the combination of a mandrel, means for revolving the mandrel, folding means, means for operating said folding means, and means for preventing operation of said folding means during the revolution of the mandrel.

52. In a machine of the class described, the combination of a mandrel, means for revolving the mandrel to wrap the stock thereon, folding means, means for operating said folding means, and means for preventing the operation of said folding means between the beginning and the end of the wrapping operation.

53. In a machine of the class described, the combination of a mandrel, means for revolving the mandrel to wrap the stock thereon, folding means, means for operating said folding means, and means for preventing revolution of the mandrel during the operation of the folding means.

54. In a machine of the class described, the combination of a mandrel, means for revolving the mandrel to wrap the stock thereon, means for applying pressure to the stock on the mandrel, folding means, means for operating said folding means, and means for locking the mandrel and the pressure means during the operation of the folding means.

55. In a machine of the class described, the combination of a mandrel, means for revolving the mandrel to wrap the stock thereon and comprising a power lever, a locking bar associated with said power lever, means for applying pressure to the stock upon the mandrel and comprising a foot lever, a locking bar associated with said foot lever, an interlocking bar, and means for engaging said bars to prevent operation of the control lever until the foot lever has been operated and to prevent operation of the foot lever during the revolution of the mandrel.

56. In a machine of the class described, the combination of a mandrel, means for revolving the mandrel to wrap the stock thereon, means for applying pressure to the stock on the mandrel, folding means, means for operating said folding means comprising a control valve, and connections between said control valve and the mandrel operating means and the pressure means to lock said mandrel operating means and pressure means during the operation of the folding means.

57. In a machine of the class described, the combination of a mandrel, and means for feeding the stock to the mandrel comprising two rollers, one of said rollers having peripheral grooves at its ends and the other roller having peripheral flanges thereon operating in said grooves to form guides for the stock.

58. In a machine of the class described, the combination of a mandrel, and means for feeding the stock to the mandrel comprising two rollers, one of said rollers having a peripheral groove at one end and a plurality of peripheral grooves at its other end, a fixed peripheral flange to operate in the groove at one end of the other roller and an adjustable peripheral flange to operate in one of the plurality of grooves at the other end of said other roller.

59. In a machine for making battery jars, the combination of a mandrel, means for feeding the stock to the mandrel, means for winding the stock about the mandrel, and positive means for smoothing the stock on the mandrel as the latter is revolved.

60. In a machine for making battery jars, the combination of a mandrel, means for feeding the stock to the mandrel, means for smoothing the stock on the mandrel, and independent means for revolving the mandrel.

61. In a machine of the class described, the combination of a mandrel, and a folding head having movable means adapted to co-operate with said mandrel.

JOSEPH W. BISHOP.

Witnesses:
 A. BRILL,
 H. V. OBERLIN.